United States Patent [19]

Traini

[11] 4,381,422

[45] Apr. 26, 1983

[54] SPACER-DAMPER FOR WIRES OF AERIAL ELECTRICAL LINES

[75] Inventor: Oscar Traini, Cardano al Campo, Italy

[73] Assignee: DAMP, S.p.A., Bergamo, Italy

[21] Appl. No.: 280,670

[22] Filed: Jul. 6, 1981

[30] Foreign Application Priority Data

Jul. 4, 1980 [IT] Italy .................................. 2923 A/80

[51] Int. Cl.³ .......................... H02G 7/14; H02G 7/12
[52] U.S. Cl. ..................................... 174/42; 174/146
[58] Field of Search ................................. 174/42, 146

[56] References Cited

U.S. PATENT DOCUMENTS 3,784,723  1/1974  Cantamessa .................... 174/146 X
3,904,811  9/1975  Otsuki et al. ..................... 174/146 X

FOREIGN PATENT DOCUMENTS 1079373  6/1980  Canada ................................. 174/42
1320893  6/1973  United Kingdom ............... 174/146

*Primary Examiner*—Laramie E. Askin

[57] ABSTRACT

Spacer-damper, to be installed on wires of aerial electrical lines, comprising a central body having as many arms hinged thereon as the wires associated with the spacer, with a vise at the end of each arm designed for engagement on the respective wire, in which the central body has at the base a sloping plane shaping from center to the sides designed to create on the spacer an effect of negative lift, while each vise at the wire embracing zone has a bearing divided into two halves, for allowing the free rotation of the wire about its own axis.

12 Claims, 5 Drawing Figures

SPACER-DAMPER FOR WIRES OF AERIAL ELECTRICAL LINES

This invention relates to a spacer-damper to be installed on aerial electrical lines in order to keep the wires spaced apart from one another and at the same time to prevent or limit the movement thereof, commonly referred to as "gallop" movement, wherein according to the invention it is contemplated that the central body of the spacer is provided with a profile developing a negative lift, and each vise designed to tighten the respective wire is internally provided with a rolling bearing for allowing the free rotation of the wire.

As well known, among the different types of oscillation that may involve the wires of an aerial line there is the so-called "gallop", which occurs when the wires are under a condition of aerodynamic instability, which may originate from various causes, but which generally arises when the wires exhibit to the wind a section which is no longer circular, but wing-shaped, with major dimension slanting to the wind direction. In the most frequent case, the gallop occurs when, under particular environment weather conditions, a light load of ice is formed on the wire surface with an asymmetric profile with respect to the wind direction. In such a case, the wind action develops an upward vertical force (lift) priming an oscillating motion of the wire or wires with all of the adverse effects as imaginable by those skilled in the art. Moreover, the phenomenon is also affected by environment factors, characteristics of the aerial electrical line, characteristics of the wire and other factors known to those skilled in the art.

It has been found that the wire gallop phenomenon, particularly as to the "wing" effect, or the build up of a light load of asymmetric profile ice, is avoided or can be prevented if the wire or wires are allowed to freely rotate on themselves.

However, this is in contrast with the fact that in modern aerial electrical lines, particularly in high voltage lines, each phase is divided into a plurality of subwires or subconductors which are kept spaced apart by spacers that, by a vise or clamp grip a respective wire and, in doing so, tend to block the movement of rotation thereof.

Therefore, in the known technique there are two requirements in contrast with each other: on one hand, it would be desirable that the wires could be free to rotate about the longitudinal axis thereof, which is not aided by the provision of the spacer vises or clamps; on the other hand, the spacers are desired since in addition to keeping the wires or subconductors spaced apart, also serve owing to particular hinges on the arms thereof to dampen other types of oscillations of the wires.

Therefore, it is the object of the present invention to provide a novel and unique spacer-damper which is capable of conciliating the two requirements, thus allowing on one hand the free rotational movement of each wire or subconductor according to its own axis and at the same time exhibiting an effect of negative lift, owing to the profile of its central body and, on the other hand, maintaining all of the advantages of the spacer-damper as offered in conventional technique.

According to the invention, this is accomplished by a device designed for the objects above mentioned, having a central body, from which as many articulated arms branch off as the wires the spacer is associated with, each arm terminating with an openable vise or jaw for engagement therein of the respective wire, characterized in that the central body has an angled profile at its base to develope a negative lift, and that each of the vises or jaws at the inside thereof have a bearing capable of assuring the rotation of the respective wire according to its own axis.

The invention will now be further described in an embodiment thereof given by mere way of unrestrictive example with reference to the accompanying drawings, in which.

Figure 1:
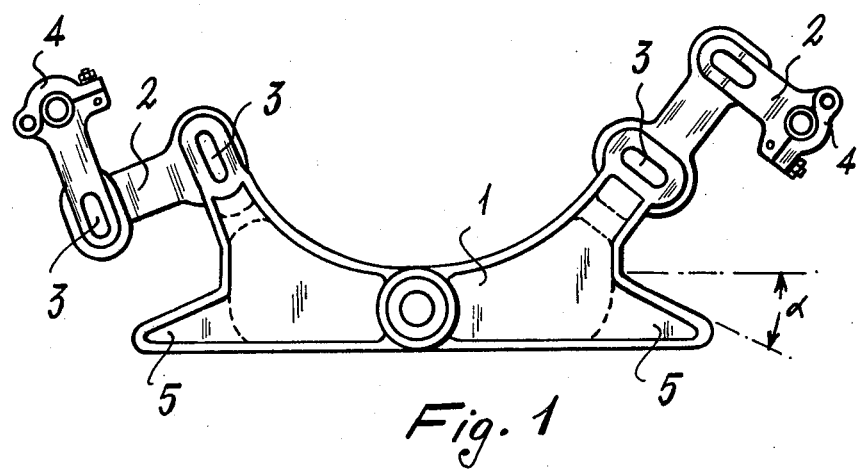
FIG. 1 is a general view of the device according to the invention.

Referring now to the accompanying drawings and generally to FIG. 1, reference numeral 1 denotes the central body of a spacer-damper, which carries as many arms 2 as the wires to be engaged, said arms 2 terminating with an openable vise or jaw 4 for the insertion therein of the respective wire. Said arms 2 are also articulated each at at least one location 3, with particular articulated joints being the subject of U.S. Pat. No. 3,784,723 to Cantamessa.

Figure 2:
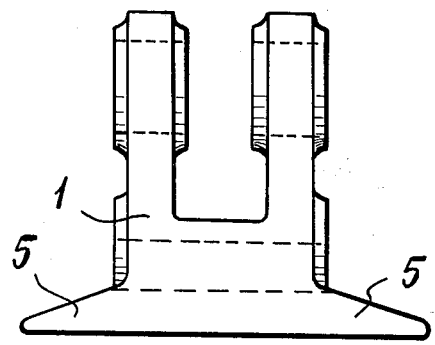
FIG. 2 is a side view of the central body of said device.

Turning now to FIGS. 1 and 2, it will be seen that the invention provides that the base of central body 1 is configurated at 5 at the two ends towards the hinges as a sloping plane, one on each side, downward facing with a suitable angulation (alpha angle), so that the wind would develop on the spacer assembly 1 an effect of negative lift; that is, a downward directed force resultant for opposition to the above-described "wing" effect. At its bottom, said central body 1 is flush with said sloping planes 5 to avoid lift phenomena with very strong winds.

Figure 3:
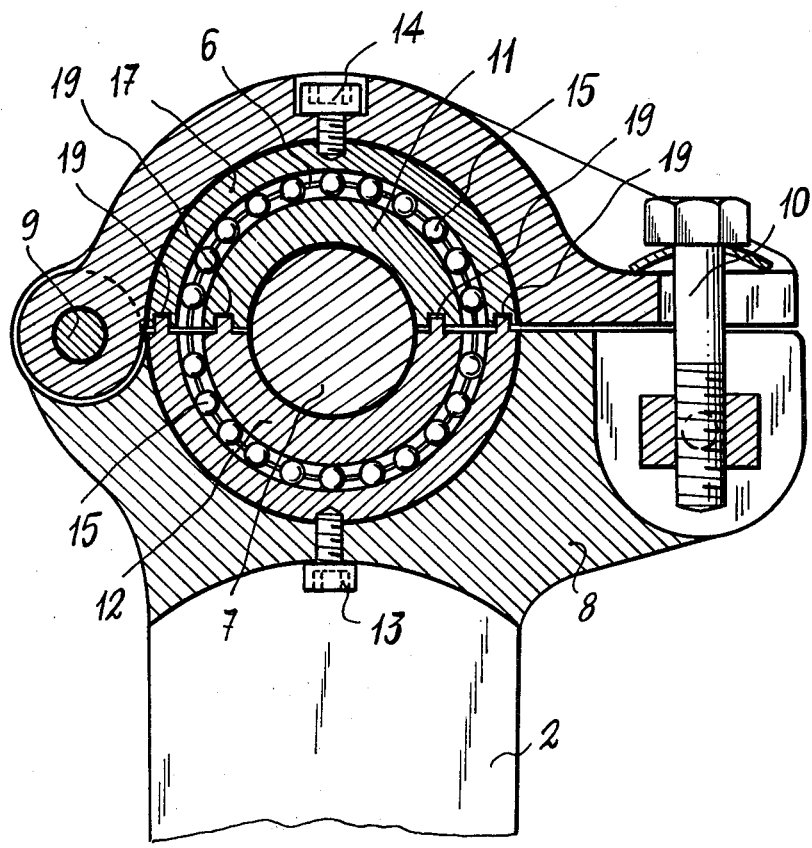
FIG. 3 is a cross-sectional view of a jaw or vise according to the invention.
Figure 4:
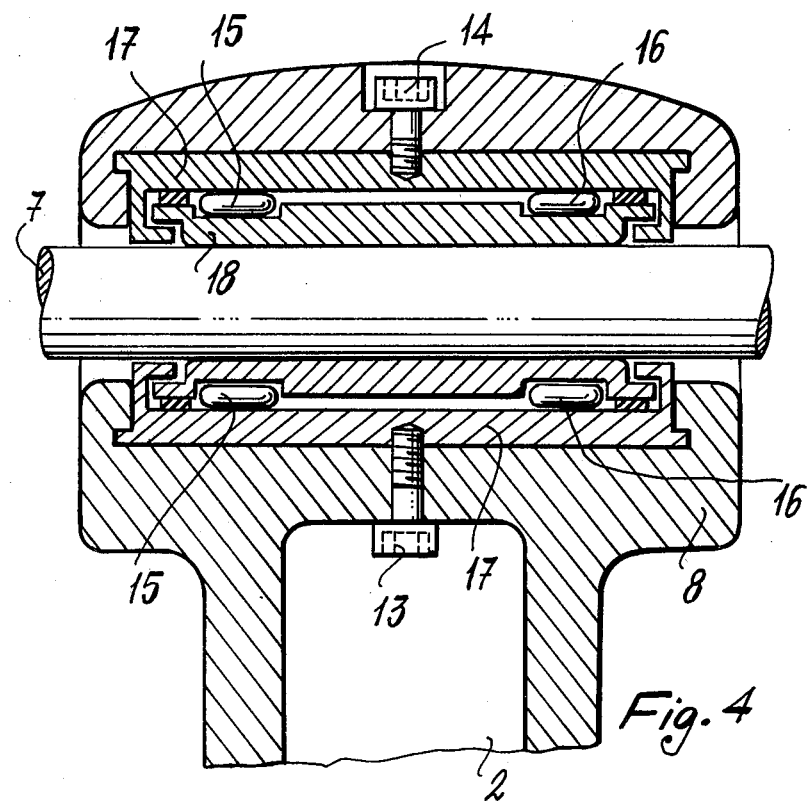
FIG. 4 is a sectional view of the jaw or vice taken according to the longitudinal axis.
Figure 5:
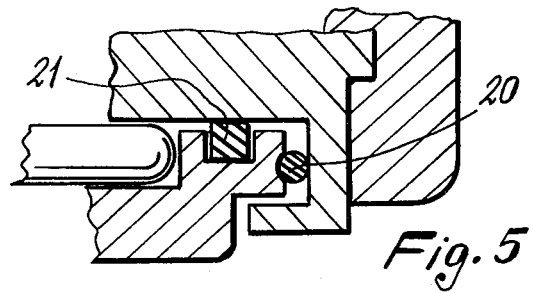
FIG. 5 is a detailed view on the end of the two parts of the bearing.

Referring now to FIGS. 3, 4 and 5, showing details of the jaw or vise relating to a respective wire 7, reference numeral 8 denotes as a whole the vise or jaw body per se known. Such a vise 8 comprises two openable and closable half-shells hinged at 9, which in a manner also well known can be secured by an element 10. Now the invention provides that at its embracing zone of wire 7 such a vise or jaw has two half-bearings, designated at 11 and 12, which, when the vise is closed on wire 7, form a rolling bearing or a complete sleeve-bearing, free of rotating with the part adhering to wire 7 relative to the remaining part firmly secured to the vise at 13 and 14.

The freely rotable part may comprise a bearing of amagnetic anti-friction metal rotating within another amagnetic seat, or similar constructions could be contemplated, such as the use of free roller bearings, ball bearings and similar expedients. By mere way of indication, we prefer herein the cage roller type for its more practical implementation and less diametrical overall size relative to ball rolling types.

Particularly, it should be noted that between the part 17 affixed to the body of vice 8 and the inner rotating part 18, on which the wire 7 rests, there are interposed on opposite sides according to the major axis two half-cages, respectively denoted at 15 and 16, thus leaving between the elements 17 and 18 an empty inner space, in which a particular type of not volatizable and long durable grease is placed, such a grease having lubricating power even at very low temperatures. As it will be seen from FIG. 3, when the two half-shells of jaw or vice 8 are closed, a perfect fixed joint is obtained between the two parts owing to the provision of projecting guides indicated at 19. Finally, as best shown in FIG. 5, the parts are laterally protected against dust, water and the like by a low friction gasket, oil seals of suitable make, labyrinth type of shapings and like expedients, as shown by reference numerals 20 and 21.

Therefore, according to the invention, a spacer-damper device is provided, enabling each individual wire to rotate on itself and at the same time, in addition to performing its own functions, developing an effect of negative lift owing to the particular shaping of its central body.

What is claimed is:

1. A spacer-damper for a plurality of suspended aerial lines comprising:
a central body carrying a plurality of arms, each of said plurality of arms terminating with means for clamping around a respective one of said lines;
and an aerodynamic surface coupled to said body and independent of said arms, said aerodynamic surface including a first surface extending horizontally away from said body and a second surface forming an acute angle with said first surface whereby said aerodynamic surface acts to impede line galloping in response to wind.

2. A spacer-damper according to claim 1, wherein said independent aerodynamic surface is formed as a part of said central body.

3. A spacer-damper according to claim 1, wherein said means for clamping are composed of two parts, each part containing roller bearings comprised of inner and outer raceways and rolling elements.

4. A spacer-damper according to claim 3, wherein said rolling elements are arranged to define a lubrication gap.

5. A spacer-damper according to claim 3, wherein said two parts of said means for clamping define locking means for locking said two elements of said means for clamping together around one of said lines.

6. A spacer-damper according to claim 3, wherein said bearings are provided with sealing and gasket elements.

7. A spacer-damper according to claim 1, wherein said central body lies below said arms in their line-clamping position.

8. A spacer-damper according to claim 1, wherein there are two aerodynamic surfaces and each of said second surfaces of said aerodynamic surfaces angle outwardly from said central body and downwardly toward said first surfaces.

9. A spacer-damper according to claim 8, wherein said second surfaces are connected to said body and said first surfaces, the second surfaces having a first predetermined width at the connections to said body and a second predetermined width at the connections to said first surfaces, said second predetermined width being greater than said first predetermined width.

10. A spacer-damper according to claim 8, wherein said first surfaces are planar.

11. A spacer-damper according to claim 8, wherein said first surfaces form a horizontal plane to which said second surfaces connect.

12. A spacer-damper according to claim 8, wherein said first surfaces are connected to said body and form a flat horizontal base therewith.

* * * * *